(12) United States Patent
Bobrow et al.

(10) Patent No.: US 8,941,680 B2
(45) Date of Patent: Jan. 27, 2015

(54) VOLUMETRIC IMAGE MOTION-BASED VISUALIZATION

(75) Inventors: Robert J. Bobrow, Arlington, MA (US); Aaron Mark Helsinger, Somerville, MA (US); Michael J. Walczak, Hudson, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1065 days.

(21) Appl. No.: 12/169,934

(22) Filed: Jul. 9, 2008

(65) Prior Publication Data
US 2010/0007658 A1    Jan. 14, 2010

(51) Int. Cl.
  *G06T 13/20* (2011.01)
  *G06T 19/20* (2011.01)
(52) U.S. Cl.
  CPC ............... *G06T 13/20* (2013.01); *G06T 19/20* (2013.01); *G06T 2219/2016* (2013.01)
  USPC ............................. 345/619; 345/419; 715/700
(58) Field of Classification Search
  CPC . G06T 13/20; G06T 19/20; G06T 2219/2016; G06T 2207/20104; H04N 21/4728
  USPC ................................................. 345/619, 419
  See application file for complete search history.

(56) References Cited

U.S. PATENT DOCUMENTS

| | | | |
|---|---|---|---|
| 4,613,946 A | 9/1986 | Forman | |
| 5,267,154 A | 11/1993 | Takeuchi et al. | |
| 5,604,856 A * | 2/1997 | Guenter | ........................ 345/473 |
| 5,706,417 A | 1/1998 | Adelson | |
| 5,920,313 A | 7/1999 | Diedrichsen et al. | |
| 5,987,345 A | 11/1999 | Engelmann et al. | |
| 6,337,699 B1 | 1/2002 | Nielsen | |
| 6,462,762 B1 | 10/2002 | Ku et al. | |
| 6,466,687 B1 * | 10/2002 | Uppaluri et al. | .............. 382/128 |

(Continued)

FOREIGN PATENT DOCUMENTS

WO    WO-2004095378    11/2004

OTHER PUBLICATIONS

Ahlberg et al., "Dynamic Queries for Information Exploration: An Implementation and Evaluation" In Proceedings of CHI'92. ACM, pp. 619-626.

(Continued)

*Primary Examiner* — Michelle L Sams
(74) *Attorney, Agent, or Firm* — Ropes & Gray LLP

(57) ABSTRACT

Systems, apparatus, and methods for displaying volumetric data using motion-based visualization techniques are provided. An apparatus storing computer executable instructions to be executed by a processor, causing the processor to carryout out a method for displaying data with multiple graphical features visually representing portions of the data and to impart motion to a graphical feature relative to a remainder of the volumetric image to highlight the first graphical feature is provided. A method for displaying a volumetric image in which motion is used to highlight a graphical feature visually representing a portion of the volumetric image relative to the remainder of the image is provided. A system for displaying a volumetric image comprising a user interface, a display, a memory for storing graphical data, and a processor that displays a volumetric image with multiple graphical features of the data and imparts motion to a user-identified graphical feature relative to a remainder of the volumetric image to highlight the first graphical feature are provided.

49 Claims, 14 Drawing Sheets

(56) References Cited

U.S. PATENT DOCUMENTS

| | | | |
|---|---|---|---|
| 6,509,906 B1 | 1/2003 | Awe et al. | |
| 6,587,787 B1 | 7/2003 | Yokota | |
| 6,629,097 B1 | 9/2003 | Keith | |
| 6,856,329 B1 | 2/2005 | Peevers et al. | |
| 6,961,061 B1 | 11/2005 | Johnson et al. | |
| 7,069,520 B2 | 6/2006 | Bobrow et al. | |
| 7,072,501 B2* | 7/2006 | Wood et al. | 382/132 |
| 7,116,749 B2 | 10/2006 | Besson | |
| 7,280,122 B2 | 10/2007 | Bobrow et al. | |
| 7,315,306 B2 | 1/2008 | Bobrow et al. | |
| 7,567,250 B2 | 7/2009 | Hao et al. | |
| 7,657,250 B2 | 2/2010 | Clayton | |
| 2001/0033330 A1 | 10/2001 | Garoutte | |
| 2002/0049742 A1 | 4/2002 | Chan et al. | |
| 2003/0206205 A1 | 11/2003 | Kawahara et al. | |
| 2004/0090359 A1* | 5/2004 | McMakin et al. | 342/22 |
| 2004/0095378 A1 | 5/2004 | Vigue et al. | |
| 2005/0010445 A1* | 1/2005 | Krishnan et al. | 705/2 |
| 2005/0093867 A1 | 5/2005 | Bobrow et al. | |
| 2005/0114551 A1 | 5/2005 | Basu et al. | |
| 2005/0147283 A1 | 7/2005 | Dwyer et al. | |
| 2007/0257912 A1 | 11/2007 | Repin | |
| 2008/0158257 A1* | 7/2008 | Bobrow et al. | 345/629 |

OTHER PUBLICATIONS

Bartram et al., "Filtering and Brushing with Motion," Information Visualization, 1(1):66-79.

Bartram et al., "Moving Icons: Detection and Distraction," In Proceedings of Interact 2001.

Becker et al., "Brushing Scatterplots," Technometrics, 29(2):127-142, (1987).

Callaghan, T.C., "Interference and Dominance in Texture Segregation," In Visual Search, D. Brogan, Ed. Taylor & Francis, pp. 81-87.

Driver et al., "Motion Cohrence and Conjunction Search: Implications for Guided Search Theory," Perception & Psychophysics, 51(1):79-85, (1992).

Duncan, J., "Boundary Conditions on Parallel Processing in Human Vision," Perceptions, 18:457-469, (1989).

Duncan, et al., "Visual Search and Stimulus Similarity," Psychological Review, 96:433-458, (1989).

Gronquist et al., "Animated Vectors for Visualization of Power System Phenomena," IEEE Transactions on Power Systems, 11(1):267-273, (1996).

Healey, Christopher, "Perceptual Techniques for Scientific Visualization," ACM SIGGRAPH, Course 6, pp. 1-26.

Healey, Christopher, "Visualizing Real-Time Multivariate Data Using Preattentive Processing," ACM Transactions on Modeling and Computer Simulation, 5(3):190-221.

Hunn, Ketil, "Preattentive Visual Information Processing," http://home.eunet.no/khunn/papers/2030.html., Research Proposal, (2000).

McLeod, et al., "Visual Search for a Conjunction of Movement and Form is Parallel," Nature, 332(10):154-155, (1988).

Nakayama et al., "Serial and Parallel Processing of Visual Feature Conjunctions," Nature 320(20):264-265, (1986).

Quinlan, et al., "Visual Search for Targets Defined by Combination of Color, Shape and Size: An Examination of Task Constraints on Feature and Conjunction Searches," Perception & Psychophysics, 41(5):455-472, (1987).

Treisman, "Preattentive Processing in Vision," Computer Vision, Graphics and Image Processing, 31:156-177, (1985).

Treisman, "Search, Similarity, and Integration of Features between and within dimensions," Journal of Experimental Psychology: Human Perception and Performance, 17(3):652-676, (1991).

Ware et al., "Perceiving Data Displayed Through Oscillatory Motion," Tech. Rep. TR94-089, Faculty of Computer Science, University of New Brunswick, (1994).

Wickens, et al., "The Proximity Compatibility Principle: Its Psychological Foundation and Relevance to Display Design," Human Factors, 37(3):473-494, (1995).

Notice of Allowance dated Sep. 30, 2009, U.S. Appl. No. 11/961,242.

Office Action dated Apr. 17, 2009, U.S. Appl. No. 11/961,242.

Office Action dated Sep. 8, 2008, U.S. Appl. No. 11/961,242.

International Prelminary Report and Written Opinion on Patentability dated Jul. 1, 2010 in International Application No. PCT/US2008/013884.

Robinson, Anthony C., "Highlighting techniques to support geovisualization," ICA Workshop on Geovisualization and Visual analystics, 2006, pp. 1-18.

Kruecker et al, "Fusion of real-time trans-rectal ultrasound with pre-acquired MRI for multi-modality prostate imaging", Proc. of SPIE—The International Society for Optical Engineering, vol. 6509, Mar. 21, 2007, pp. 650912/1-650912/12.

Ramos et al, "Tumble! Splat! Helping users access and manipulate occluded content in 2d drawings," Proceedings of the Working Conference on Advanced Visual Interfaces, 2006, pp. 428-435.

Lum et al, "Using motion to illustrate static 3D shape—Kinetic visualization," IEE Transactions on Visualization and Computer graphics, vol. 9, No. 2, Apr.-Jun. 2003, pp. 115-126.

International Search Report and Written Opinion dated Sep. 1, 2009 in International Application No. PCT/US2008/013884.

Braddick et al., "Serial Search for Targets Defined by Divergence or Deformation of Optic Flow," Perception, 20:345-354, (1991).

\* cited by examiner

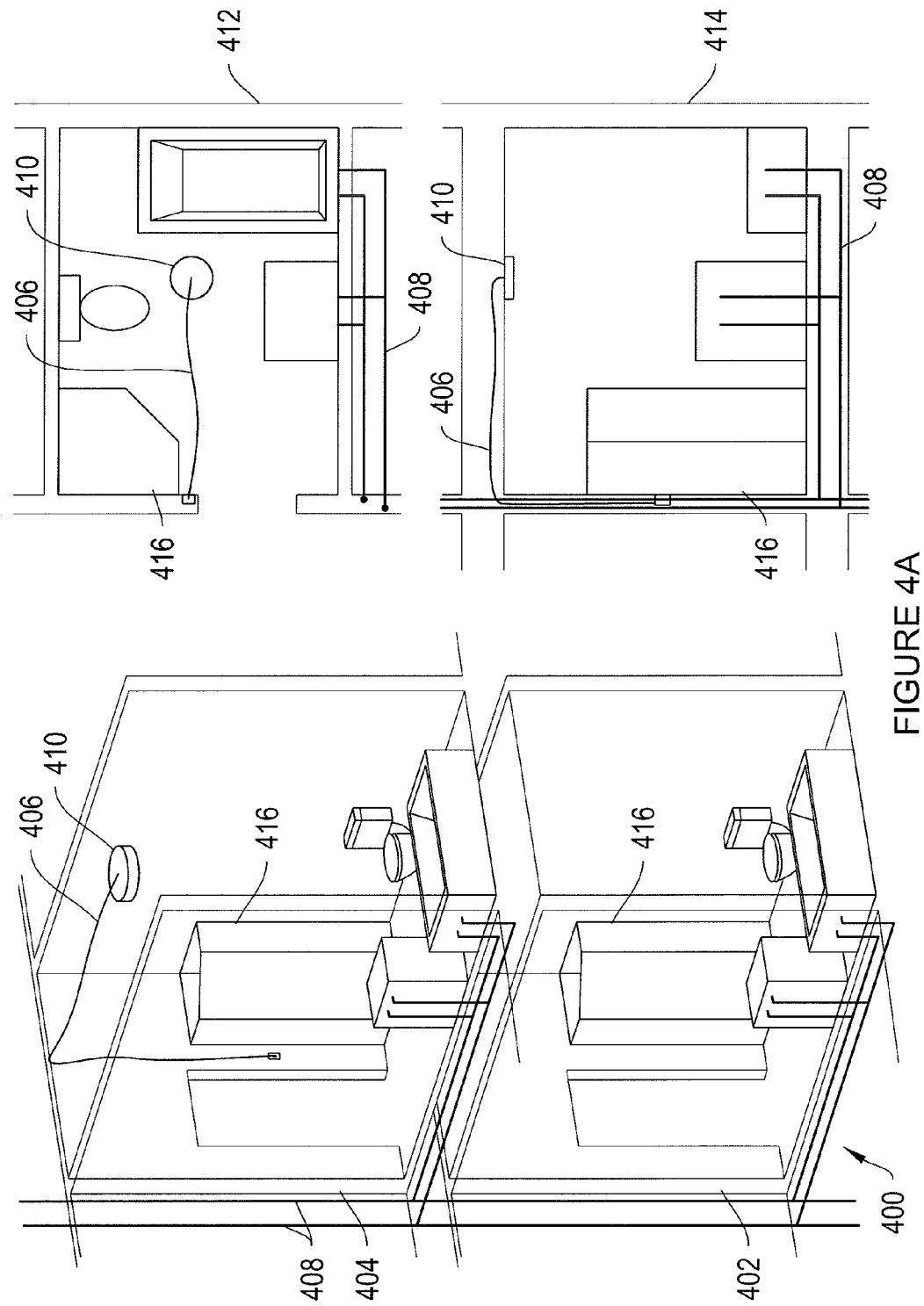

VOLUMETRIC IMAGE MOTION-BASED VISUALIZATION

BACKGROUND OF THE INVENTION

1. Field of the Invention

The present invention is directed to data display. It particularly concerns effectively displaying high-dimensional data, including, but not limited to, volumetric data, e.g., medical image data, security screening data, or architectural drawing data.

2. Background Information

In recent years, it has become commonplace to use computers to obtain desired information from databases far too large for individual-human comprehension. Software has been developed for performing analysis of a highly sophisticated nature, and such software is often able to detect trends and patterns in the data that would, as a practical matter, be impossible for an individual human being to find.

The converse is often also true. Particularly when the question to be asked does not lend itself to easy definition, computers often have difficulty detecting patterns that are readily apparent to human beings. And this human capability is best brought to bear when the data in question are presented graphically. Data presented graphically usually are more readily understandable than the same data presented only in, say, tabular form. But the degree of the resultant understanding greatly depends on the nature of the display, and determining what the appropriate display should be can present a significant problem.

The way to represent many types of data, for example, volumetric medical image data, poses a significant challenge to determine. Volumetric images may be quite complex. In such images, a volume element is referred to as a "voxel" (analogous to a pixel in two-dimensional space). Depending on the transparency assigned to the voxels, graphical features that may be of interest to a viewer may be obscured by other voxels. Similarly, the complexity of volumetric images, in some fields, for example, medical imaging, result in the boundaries of various features being difficult to detect.

To help human users employ such data and images effectively, there is a need for presentation or data display systems which make important features, (e.g., patterns, structures, etc.) "stand out" from the other data presented on the display. For example, some systems employ color, line thickness, etc. to highlight graphical features which visually represent portions of the data that meet criteria of particular interest. Another approach is the use of stereo and rotating perspective displays in data display systems. However, while stereo views and rotating perspective views increase the human user's understanding of volumetric data and images, they do not by themselves make portions of the displayed image stand out from the other data presented on the display.

Another approach that may be used to display data and images is "brushing," which is sometimes used when representations of the same data objects are displayed simultaneously in different relative locations in different displays. (The displays can be on the screens of different monitors, for example, or on different parts of a single monitor's screen.) In brushing, a user employs a mouse or other device to select a subset of the objects in one display, and the display system highlights other display's objects that represent the same objects.

Another technique, previously proposed in assisting human users to distinguish important graphical features in two-dimensional images is to impart motion to these graphical features. Such a display technique takes advantage of the inherent ability of the human perception system to recognize patterns in data by quickly associating graphical features that are moving in the same fashion.

SUMMARY OF THE INVENTION

The present invention provides systems, apparatus, and methods for processing data which may be displayed as 3-dimensional or volumetric images. The display of this data uses motion-based visualization.

In one aspect, the invention relates to a computer readable medium storing computer executable instructions, which, when executed by a processor, cause the processor to carryout a method for displaying data. This method includes receiving graphical data, displaying a volumetric image incorporating a plurality of graphical features visually representing portions of the data, and imparting motion to one of the graphical features relative to the remainder of the volumetric image to highlight this graphical feature. In one embodiment, the computer executable instructions cause the processor to impart a second motion to a second graphical feature of the volumetric image that is different than the first motion imparted on the first graphical feature to visually distinguish the two graphical features from one another. In another embodiment, the computer executable instructions cause the processor to impart a second motion to the entire volumetric image that is different than the first motion to visually distinguish the first graphical feature of the volumetric image from a remainder of the volumetric image when viewed from multiple perspectives. In a further embodiment, the computer executable instructions cause the processor to impart a localized motion to a part of the first graphical feature of the volumetric image to visually distinguish that part of the first graphical feature of the volumetric image from the remainder of the volumetric image. Such motion-based visualization provides significant data comprehension benefits with single perspective displays, rotating perspective displays and stereo displays.

The term graphical feature, as used herein, refers to a collection of one or more voxels having a logical connection to one another. For example, such voxels may correspond to portions of a same physical structure. The voxels may be logically connected due to their relationship to different structures in a common network (e.g., electrical networks, communication networks, social networks, etc.). Voxels may also related due to their sharing a common characteristic. For example, in medical imaging, the voxels in a graphical feature may be related in that they correspond to tissue having a common density or to a fluid flow having a common flow rate. Generally, the logical connection can be any criteria selected by a user for selecting groups of voxels or any criteria applied by an artificial intelligence, signal processing, or pattern recognition system designed for identifying relevant features in data.

In some embodiments, the volumetric image may be obtained from a plurality of image sources. Specifically, the graphical data may correspond to medical image data, security screening data, or architectural drawing data. In other embodiments, the medical image data may be captured using different imaging techniques. In certain embodiments, the processor may obtain three-dimensional data by analyzing a set of data having at least two dimensions, and in other embodiments, at least one part of the graphical data is received from a different source than used for a remainder of the graphical data.

In a further embodiment, the processor also receives an input from a user. This user input may comprise, among other inputs, a query, a cursor brush, or a mouse click. In some embodiments, based on the user input, the computer executable instructions cause the processor to identify one of the graphical features of the volumetric image by determining bounds of selected subject matter.

In another aspect, the invention relates to a method for analyzing data having at least three dimensions. This method includes receiving data for display, displaying a volumetric image incorporating a plurality of graphical features visually representing portions of the data, and imparting motion to one of the graphical features relative to the remainder of the volumetric image to highlight this graphical feature.

In another aspect, the invention relates to a data visualization system for displaying a volumetric image. This system includes a user interface, a display, a memory for storing graphical data, and a processor. The processor is configured for receiving graphical data and displaying a volumetric image incorporating a plurality of graphical features of the data. Additionally, the processor is configured for processing input from the user interface to identify a first of the displayed graphical features, and to impart motion to the first identified graphical feature relative to the remainder of the volumetric image to highlight the first graphical feature. Optionally, the system can include a medical imaging device, a security screening device, or a device for generating architectural drawings. To this end, the graphical data may correspond to medical image data, security screening data, or architectural drawing data. In a further embodiment, the medical image data may be obtained from a plurality of medical imaging devices. Optionally, the medical image data may be captured from the medical imaging device using different imaging techniques. In some embodiments, the user interface of the data visualization system receives a user input.

BRIEF DESCRIPTION OF THE DRAWINGS

The invention description below refers to the accompanying drawings, of which:

FIG. 4A illustrates a volumetric architectural drawing in which multiple graphical features of the drawing are displayed;

DESCRIPTION OF CERTAIN ILLUSTRATIVE EMBODIMENTS

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

Figure 1:
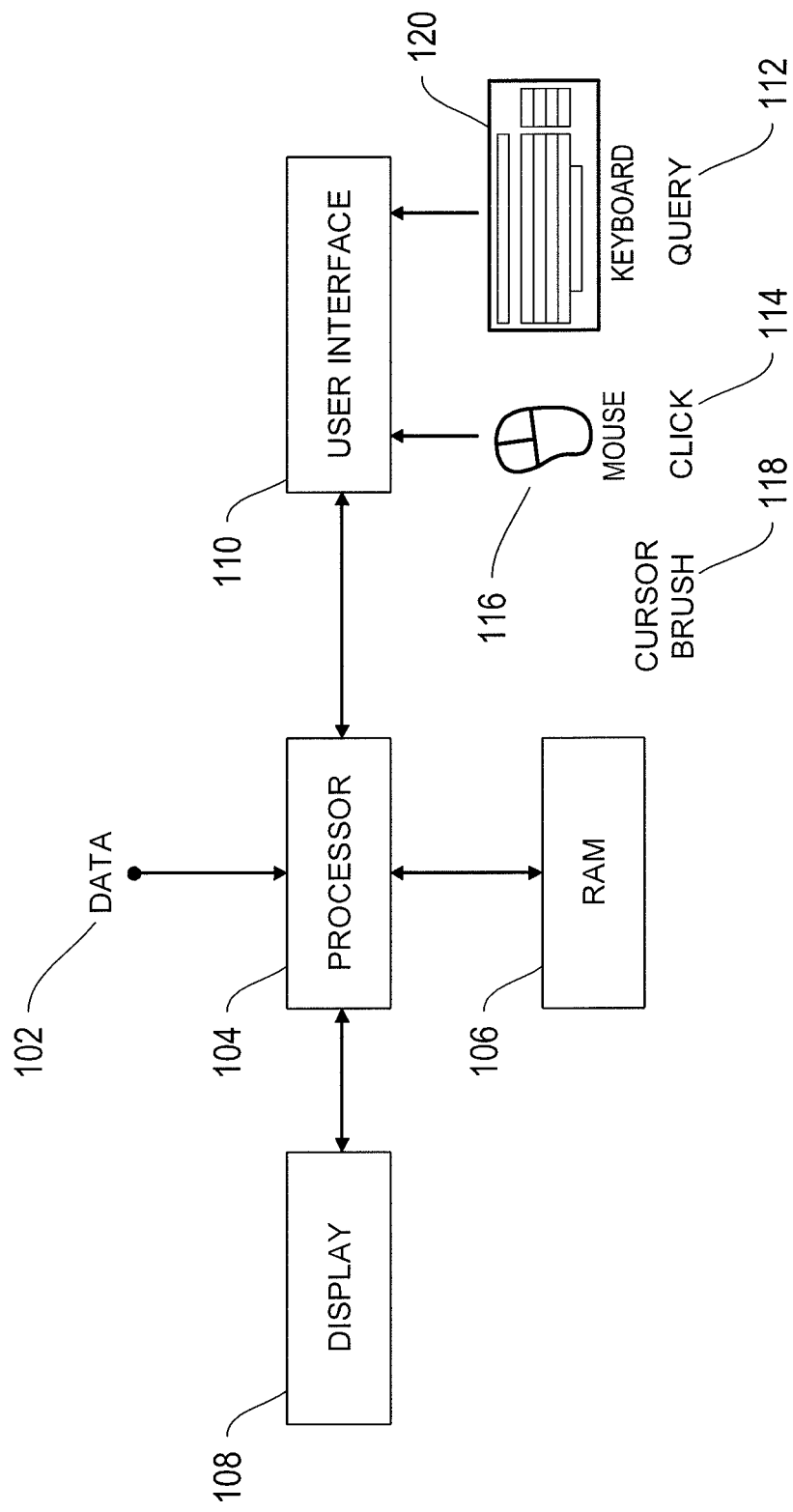
FIG. 1 is a block diagram of a data visualization system in which the present invention's teachings may be implemented.

FIG. 1 is a block diagram of a data visualization system 100, according to an illustrative embodiment of the invention. The data visualization system 100 includes a processor 104, a memory 106, e.g., Random-Access Memory (RAM), a display 108, and a user interface 110. Processor 104 operates on data 102 to form a volumetric image in accordance with computer executable instructions loaded into memory 106. The instructions will ordinarily have been loaded into the memory from local persistent storage in the form of, e.g., a disc drive with which the memory communicates. The instructions may additionally or instead be received by way of user interface 110. In some embodiments, processor 104 may be a general purpose processor, such as a Central Processing Unit (CPU), a special purpose processor, such as a Graphics Processing Unit (GPU), or a combination thereof.

Data visualization system 100 displays the volumetric image on display 108. Display 108 may be any display device capable of interfacing with processor 104, e.g., an LCD display, a projector, a stereo display, a CRT monitor, or a combination thereof. One or more human users may interact with display 108 via user interface 110. For instance, system 100 could receive user input via user interface 110 from devices such as a mouse 116 and a keyboard 120. The user input could include, among other inputs, a query 112, a mouse click 114, or a cursor brush 118. The user input could also originate from devices connected to user interface 110 remotely, e.g., via a network connection.

Data visualization system 100 may receive data 102 into memory 106 in ways similar to those in which the instructions are received, e.g., a disc drive with which the memory communicates. In addition, data 102 may be received from a network, e.g., a local area network, a wireless area network, or another processor.

Processor 104 in data visualization system 100 is configured to operate on data 102. In particular, processor 104 is configured to process received input from user interface 110, to carry out operations on data 102, to identify graphical features visually representing portions of the processed image, and to display the processed image or identified graphical features of the processed image on display 108. For example, processor 104 can form a volumetric image and display an identified graphical feature of this image on display 108, as will be described further in reference to FIGS. 2C, 2D, 3D, and 4D.

In some embodiments, data visualization system 100 may include a medical imaging device, a security screening device, or a device for generating architectural drawings, each of which can generate data 102. Thus, data 102 may correspond to medical image data, security screening data, or architectural drawing data. The medical image data may be obtained from a plurality of medical imaging devices e.g. a Computer-Aided Tomography (CAT) scan machine, or a Magnetic Resonance Image (MRI) machine. In the case of CAT scans or MRIs, for example, the processor may obtain three-dimensional data by analyzing a set of data having at least two dimensions. In some embodiments, at least one part of the data is received from a different source than used for a remainder of the data, e.g., a set of CAT scans may be received from a CAT scan machine, and a set of MRIs may be received from an MRI machine. The data visualization system 100 of FIG. 1 then combines the data from the two sources to display a single volumetric image.

Figure 2A:
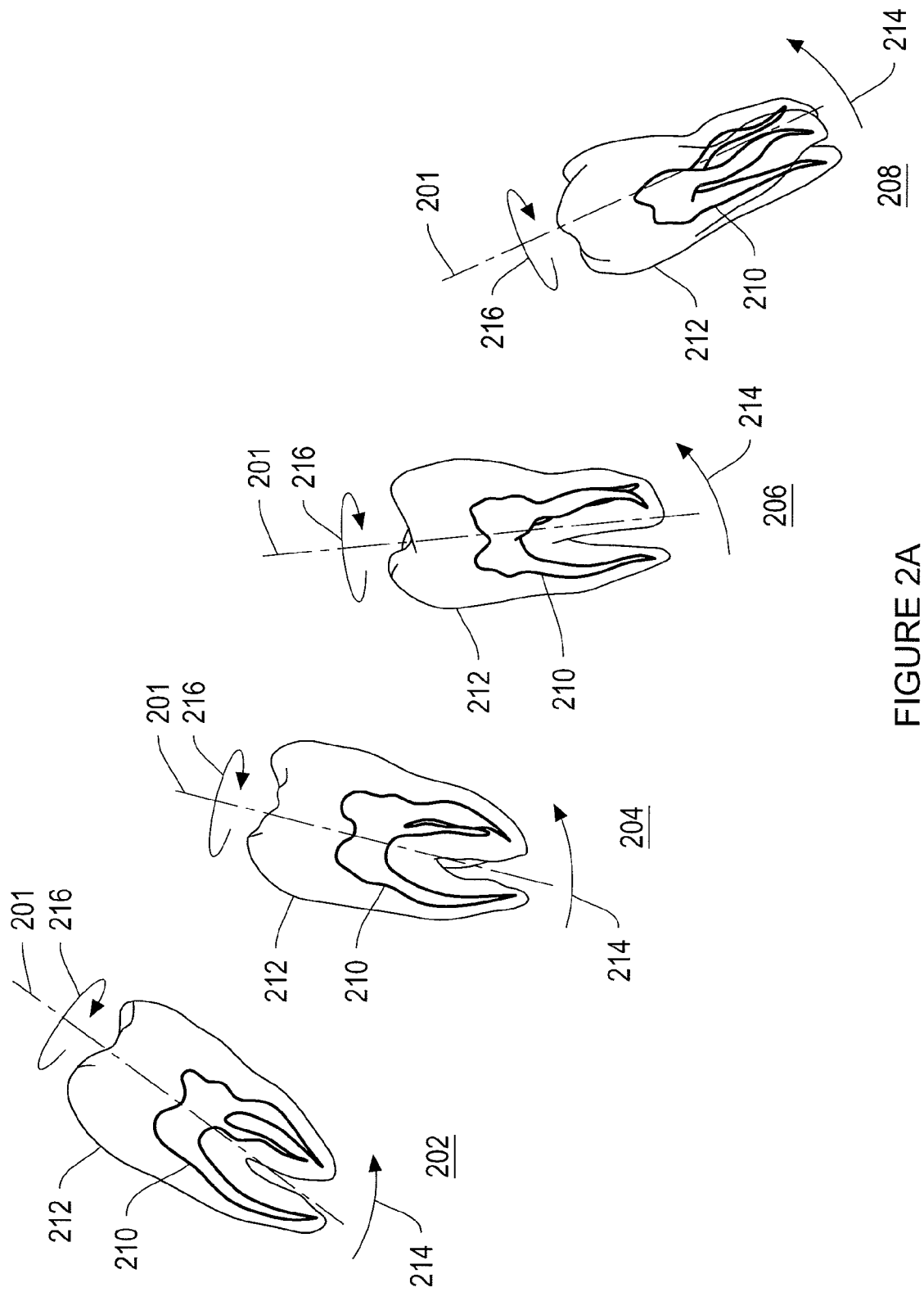
FIG. 2A is a simple illustration of a tooth, an example of a volumetric image of the type that may be displayed in accordance with one of the invention's aspects.
Figure 2B:
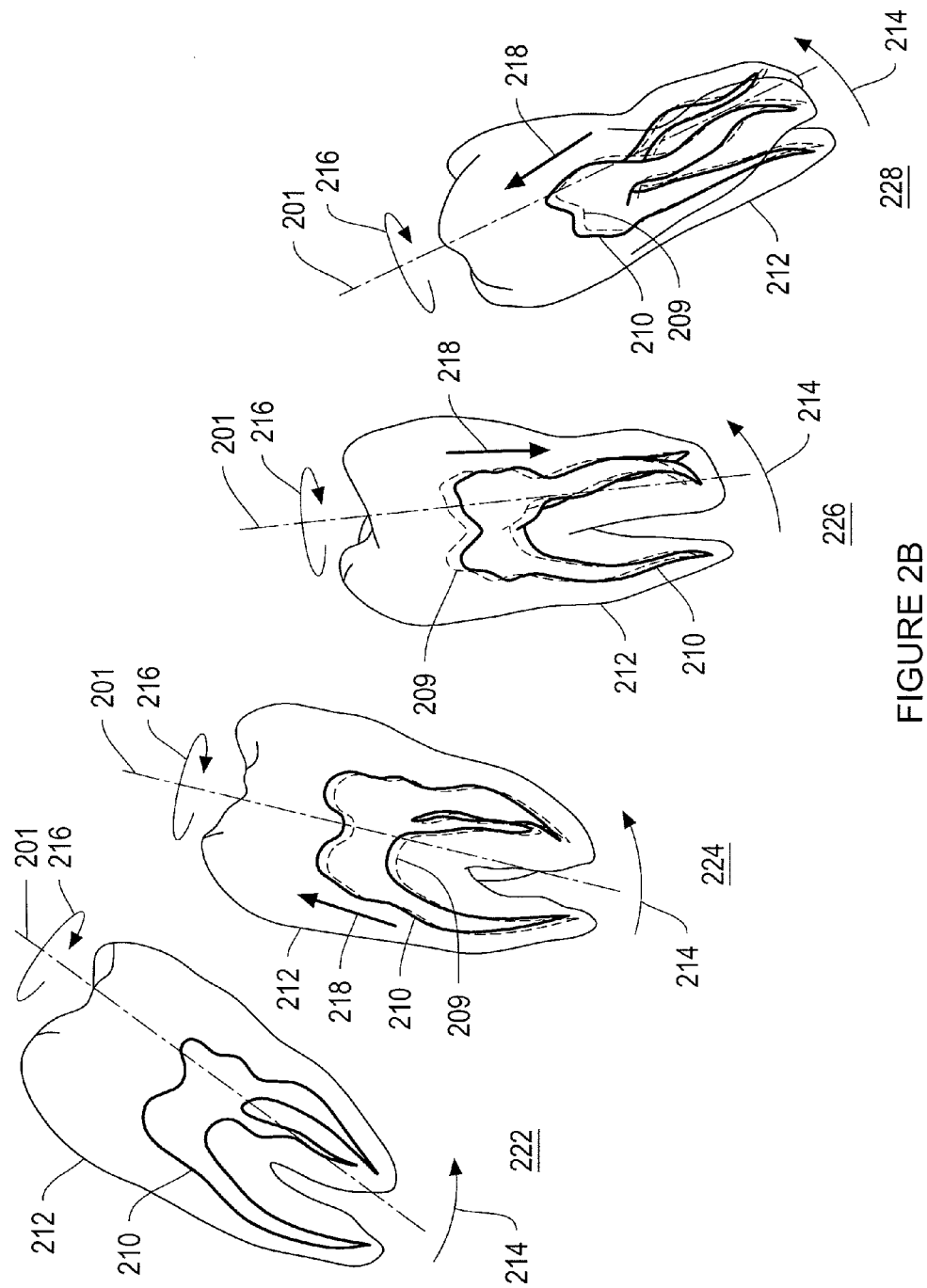
FIG. 2B illustrates the volumetric image from FIG. 2A in which a first graphical feature of the volumetric image moves relative to the remainder of the volumetric image.
Figure 2C:
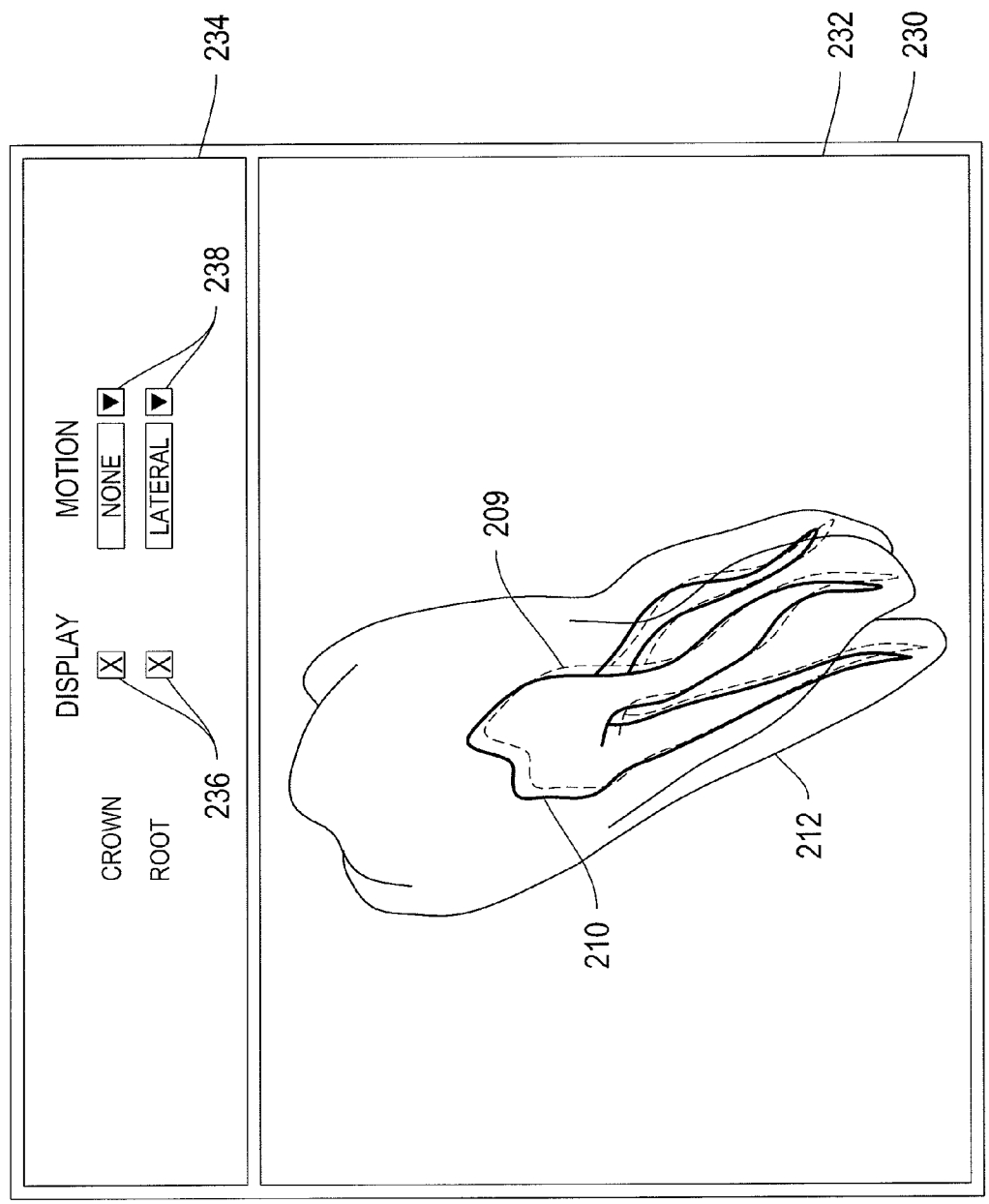
FIG. 2C is a diagram of a display containing a volumetric image with a plurality of graphical features in which all graphical features are displayed.
Figure 2D:
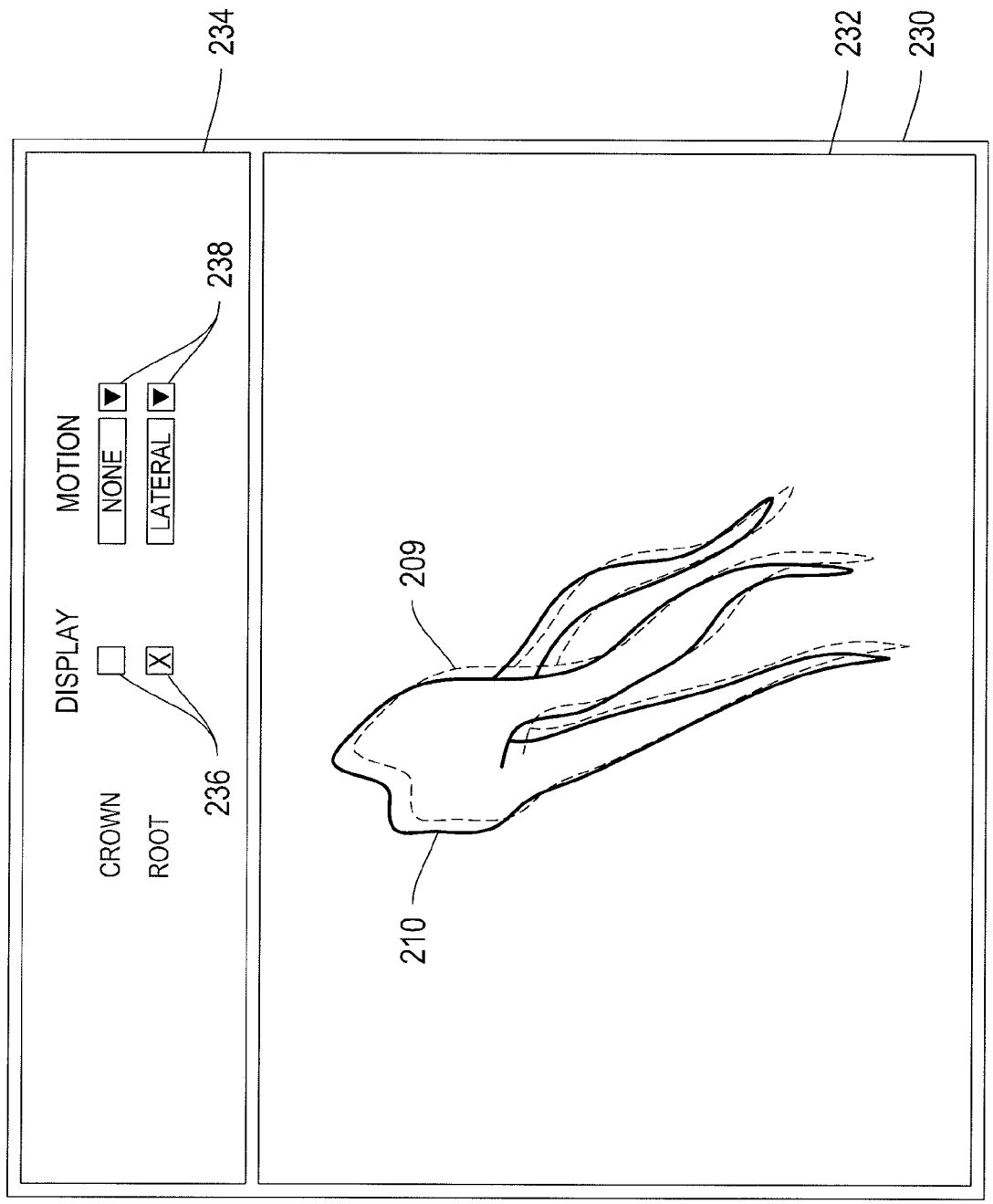
FIG. 2D is a diagram of a display containing a volumetric image with a plurality of graphical features, in which only one graphical feature is displayed.
Figure 2E:
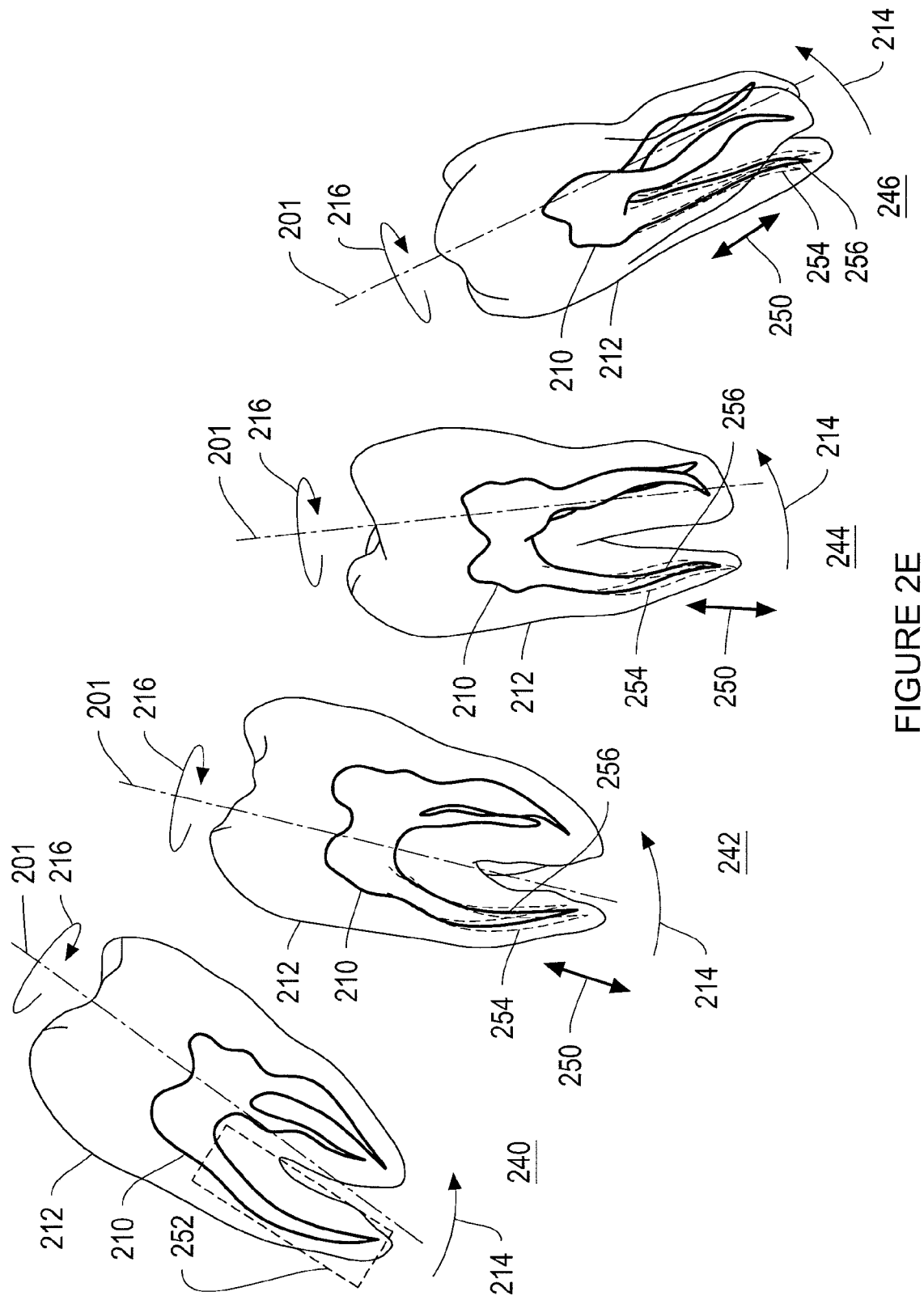
FIG. 2E illustrates the volumetric image from FIG. 2A in which a part of the first graphical feature of the volumetric image possesses a localized motion relative to the remainder of the first graphical feature of the volumetric image.

FIGS. 2A-2E are a series of 3-dimensional images of a tooth displayed on display 108 of data visualization system 100 in FIG. 1, according to an illustrative embodiment of the invention. These series of images are illustrative of volumetric images that can be processed and displayed by data visualization system 100 in FIG. 1. FIGS. 2A, 2B, and 2E, show displays of the tooth including the crown and root, and illustrate how data visualization system 100 of FIG. 1 can impart motion on graphical features of the tooth to highlight those graphical features. FIGS. 2C and 2D show a user interface employed by the data visualization system 100 in FIG. 1 for controlling the display and/or motion of image graphical features. Graphical features of displayed images depicted with dashed lines in FIGS. 2A-2E correspond to initial positions of those graphical features relative to the displayed object to aid the reader in discerning imparted motion depicted in the figures. The data visualization system 100 of FIG. 1 need not display these lines.

FIG. 2A shows a time series of images of a tooth, an example of a volumetric image displayed by data visualization system 100 of FIG. 1. Graphical data from which the volumetric image was formed may have been captured by a medical imaging device, e.g., a panoramic X-ray machine, that is part of data visualization system 100 of FIG. 1. The data visualization system displays the tooth in various orientations, 202, 204, 206, and 208, respectively, moving the tooth as illustrated by motion arrows 214 and 216. Motion 216 is a rotation of the tooth about longitudinal axis 201, while motion 214 is a rotation of the tooth in a fixed plane relative to longitudinal axis 201. In each orientation, both root 210 and crown 212 are displayed.

FIG. 2B shows a time series of images of the tooth from FIG. 2A which illustrates how the data visualization system 100 of FIG. 1 can highlight a graphical feature of a volumetric image by imparting relative motion to that graphical feature. In this series of images, the data visualization system displays the tooth in various orientations, 222, 224, 226, and 228, respectively, moving the tooth as illustrated by motion arrows 214 and 216, which are similar to those shown in FIG. 2A. In addition, in orientations 224, 226, and 228, respectively, the data visualization system 100 of FIG. 1 imparts motion 218 on root 210. In each of these orientations, the dashed lines 209 correspond to initial positions of root 210 relative to the rest of the tooth. Furthermore, in each orientation, i.e., when viewed by the reader from multiple perspectives, root 210, crown 212, and the relative motion of root 210, are displayed.

FIG. 2C is a diagram of a user interface window 230 generated by the data visualization system 100 of FIG. 1 for controlling the display and/or motion of graphical features visually representing portions of volumetric images. The tooth of either FIG. 2A or FIG. 2B could be displayed in user interface window 230. In FIG. 2C, user interface window 230 is divided into two sub-windows: window 232 containing a volumetric image, namely the tooth of FIG. 2B, and window 234 containing a graphical user interface in which a human user, interacting with data visualization system 100 via user interface 110, may select various options for displaying and/or imparting motion on the graphical features of the image in window 232.

A human user interacting with data visualization system 100 of FIG. 1 can use graphical user interface window 234 to choose whether to display crown 212, root 210, both crown 212 and root 210, or neither crown 212 or root 210 by selecting or de-selecting the appropriate boxes 236. Such a selection could be carried out using a mouse (114 in FIG. 1) or a keyboard query (112 in FIG. 1). Alternatively, a user could click directly on the image in window 232 to select graphical features for display. In FIG. 2C, both display boxes 236 are selected or marked "x" such that both graphical features of the tooth, crown 212 and root 210, are displayed.

In addition, a human user interacting with data visualization system 100 of FIG. 1 can choose what kind of motion to impart to crown 212 or root 210 by selecting an option in the drop-down menus 238. Examples of motion imparted by data visualization system 100 of FIG. 1 could be lateral motion, vertical motion, horizontal motion, circular motion, full- or partial-rotation motion, or no motion ("none"). Such a selection could be carried out using a mouse (114 in FIG. 1) or a keyboard query (112 in FIG. 1). Alternatively, a user could click or drag directly on the image in window 232 of data visualization system 100 of FIG. 1 to select graphical features visually representing portions of the data on which the data visualization system will impart motion. In FIG. 2C, for example, the selection of options in drop-down menus 238 is such that no motion is to be imparted on crown 212, while vertical motion is to be imparted on root 210. Thus, the data visualization system imparts motion 218 on root 210 relative to crown 212. The initial position of root 210 is depicted with dashed lines 209.

The data visualization system 100 of FIG. 1 could be used to identify a graphical feature visually representing a portion of a volumetric image by determining bounds of selected subject matter based on user input. Such a determination could be made by a human user using a mouse click, keyboard query, or a cursor brush to select an appropriate graphical feature, e.g., root 210 or crown 212, after which the data visualization system automatically determines the bound of the selected graphical feature based on the human user input. In some embodiments, the user input could also be received from an external source. Alternatively, the data visualization system 100 of FIG. 1 could determine the bounds of a selected graphical feature using, e.g., Artificial Intelligence (AI), or image processing algorithms. Using such algorithms, the metes and bounds of a graphical feature could be determined, for example, by finding the parts of a volumetric image that are similar to other parts of the same volumetric image based on a similarity metric. For example, a user may select a part of a map image corresponding to bridges, and this selection would result in the data visualization system 100 in FIG. 1 identifying and displaying all other bridges on the map. In the data visualization system 100 in FIG. 1, the metrics on which similarity is based could be, for example, entered by the user in a query, or initially estimated by an AI algorithm executed by data visualization system 100 of FIG. 1. For example, all the voxels of a volumetric image within a certain user-defined range could be displayed, or all the voxels in a particular part of a volumetric image within a pre-determined range of the AI algorithm could be displayed.

FIG. 2D is diagram of the user interface window 230 of FIG. 2C generated by the data visualization system 100 of FIG. 1. In contrast to FIG. 2C, only one of the display boxes 236 is selected such that root 210 is displayed, and no crown is displayed. In addition, the selection of options in drop-down menus 238 is such that data visualization system 100 of FIG. 1 imparts vertical motion 218 on root 210.

FIG. 2E shows a time series of images of the tooth from FIG. 2B which illustrates how the data visualization system 100 of FIG. 1 can highlight a part of a graphical feature of a volumetric image by imparting motion to that part of the graphical feature relative to the remainder of the graphical feature. In this series of images, the data visualization system displays the tooth in various orientations, 240, 242, 244, and 246, respectively, moving the tooth as illustrated by motion arrows 214 and 216, which are similar to those shown in FIG. 2B. In addition, in orientations 242, 244, and 246, respectively, the data visualization system 100 of FIG. 1 imparts motion 250 on portion 254 of root 210. Portion 254 of root 210 is contained within the dashed box 252 in image 240. In each of these orientations, the dashed lines 256 correspond to initial positions of the portion 254 of root 210 relative to the remainder of root 210. Furthermore, in each orientation, i.e., when viewed by the reader from multiple perspectives, root 210, crown 212, and the relative motion of portion 254 of root 210, are displayed.

In the case of portion 254 of root 210 in FIG. 2E, a human user interacting with the data visualization system 100 of FIG. 1 could select the portion 254 of root 210 by creating dotted box 252 within a user interface window of the data visualization system 100 of FIG. 1. Dotted box 252 could be created by performing a click-and-drag operation with a mouse, for example. Alternatively, data visualization system 100 of FIG. 1 identifies portion 254 of root 210 in FIG. 2E using a computer-executable pattern recognition or signal processing algorithm. In some embodiments, such an identification may not involve user input.

In an alternative embodiment, data visualization system 100 of FIG. 1 could impart motion on a part of a graphical feature of a volumetric image relative to the remainder of the graphical feature, as well as impart motion on the part itself relative to the remainder of the image. With respect to FIGS. 2B and 2E, an example of such a display would be one in which data visualization system 100 of FIG. 1 imparts motion 250 on portion 254 of root 210 and simultaneously imparts vertical motion 218 on root 210.

In a further embodiment, data visualization system 100 of FIG. 1 could impart a first motion on the entire displayed volumetric image, while simultaneously imparting a second motion on a graphical feature of the volumetric image relative to the remainder of the volumetric image. With respect to FIGS. 2C and 2D, an example would be one in which data visualization system 100 of FIG. 1 imparts rotational motion 216 (of FIGS. 2A, 2B, and 2E) on the entire tooth, and simultaneously imparts vertical motion 218 on root 210. Although not shown in FIGS. 2C and 2D, a human user interacting with the data visualization system 100 of FIG. 1 could select a motion to impart on the entire displayed volumetric image via interactions with user interface windows 232 and 234 in either of these figures.

This approach to representing graphical data is advantageous because, although the user could, by careful attention, identify the bounds of the root on the tooth in FIGS. 2A-2E, automatically determining the bounds of the root and displaying the root in motion cause it to "jump out" at the human viewer. It some instances, e.g. assuming that portion 254 of root 210 is diseased, it may be desirable to have data visualization system 100 of FIG. 1 display this graphical feature of the root such that it "stands out" from the rest of the root. This approach could be important for purposes of planning a medical procedure, or for verifying that the data visualization system 100 of FIG. 1 has correctly identified the diseased portion of the root. In addition, it would be beneficial to display this part of the root in a manner such that the originally presented information, i.e. root 210 and crown 212, for example, is not obscured. In particular, any given 2-dimensional slice of the tooth would not provide a full understanding of where the diseased portion of the root is located. Furthermore, by using motion-based visualization for the root, one reduces the risk of misidentifying the diseased portion 254, or the extent thereof. For instance, if one were to highlight the diseased portion 254 using a different color or texture instead of imparting motion on the diseased portion 254, the other displayed parts, e.g., root 210 and crown 212, of the tooth may be obscured.

In the illustrations of FIGS. 2A-2E, the relative motions imparted on graphical features of the image by data visualization system 100 of FIG. 1 may also be vibrations—harmonic or random. For example in FIG. 2E, portion 254 of root 210 could, for example, have vertical or lateral vibrational motion relative to the remainder of root 210. And, the motion is not necessarily a change in position from some rest position; it can, for instance be a small change in shape, such as a rhythmic contraction or expansion of portion 254 of root 210 in FIG. 2E.

Figure 3A:
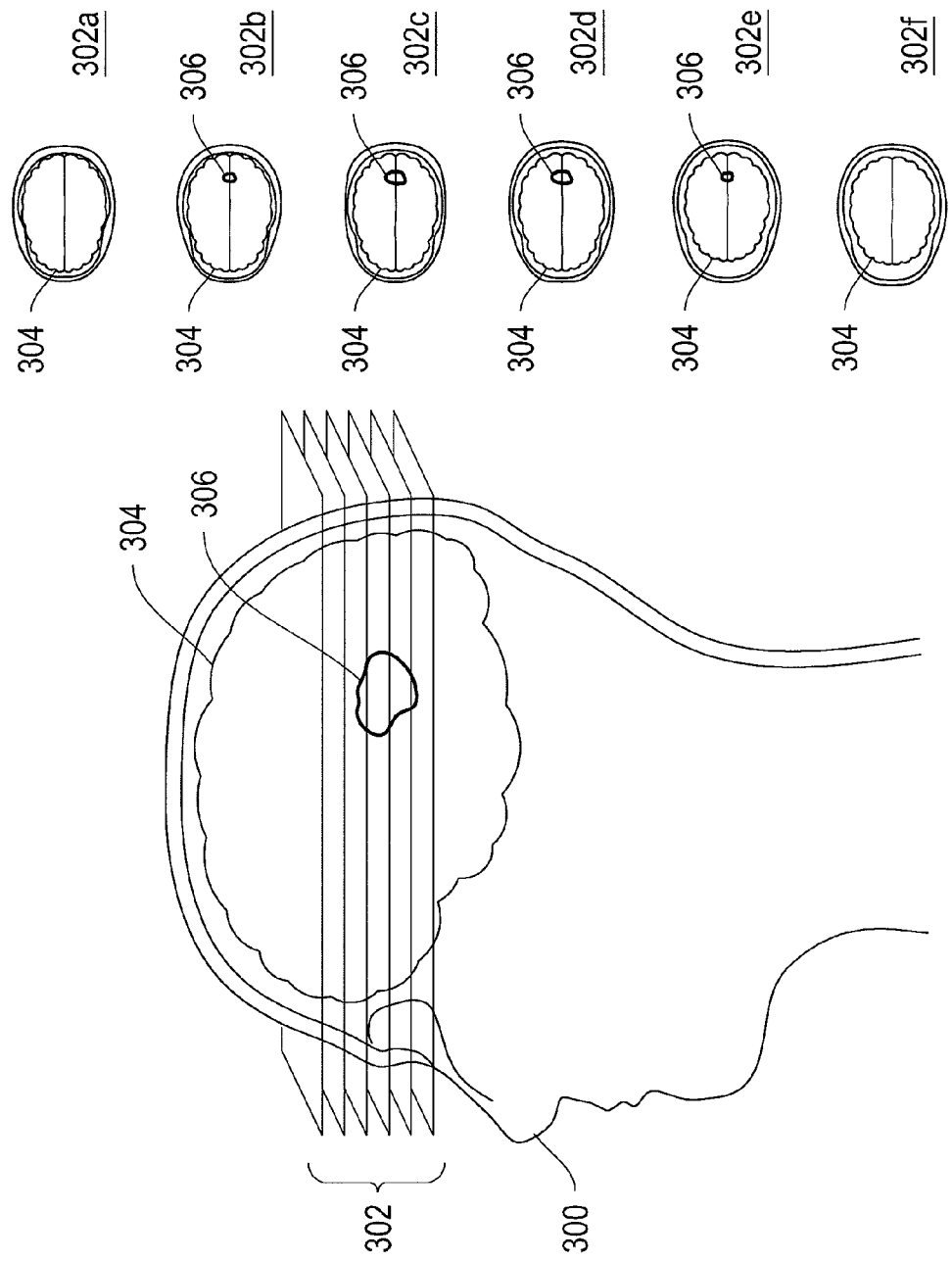
FIG. 3A is a schematic that illustrates the application of a medical imaging technique in which 2-dimensional medical images or "slices" of a human skull are captured.
Figure 3B:
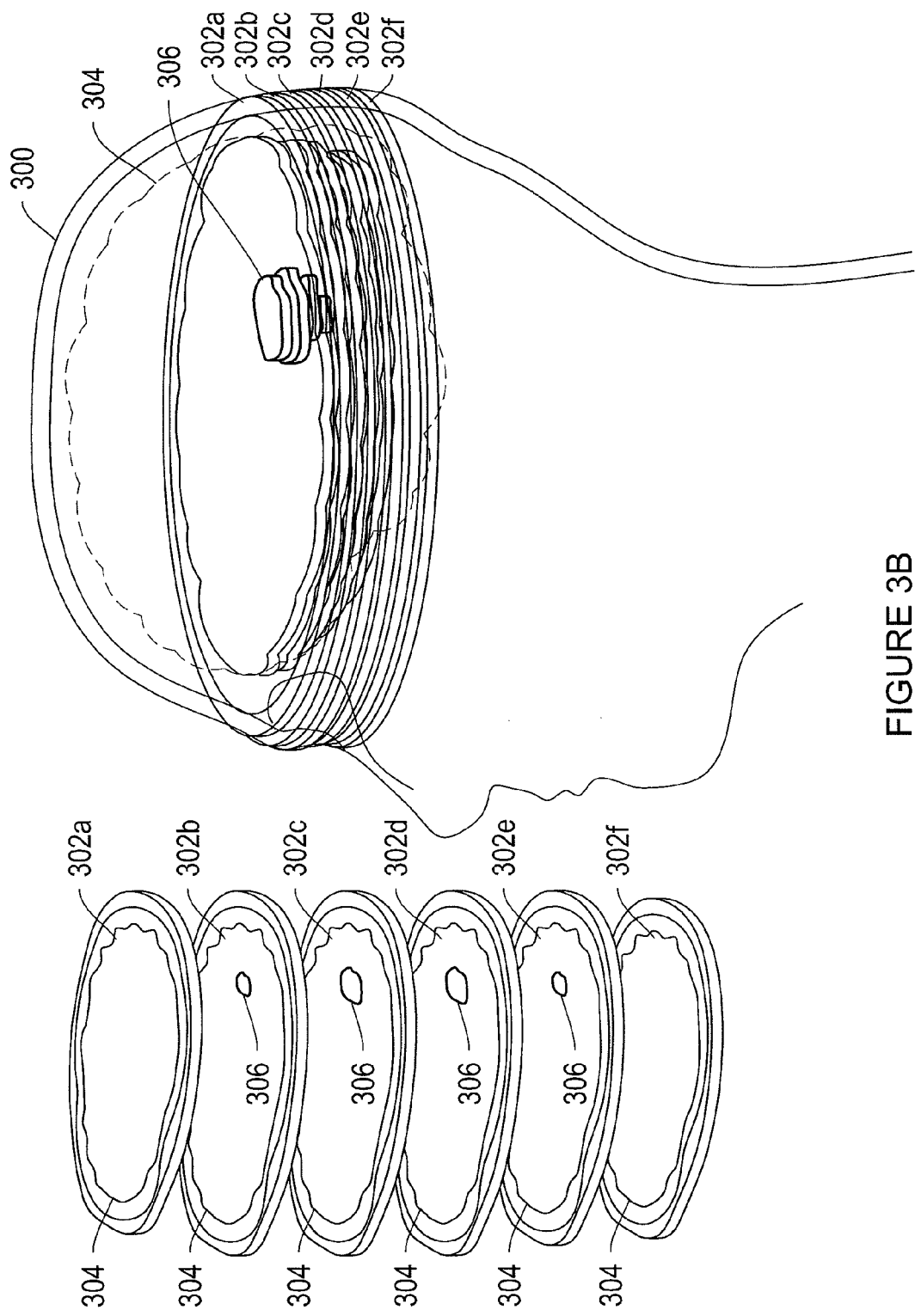
FIG. 3B is a schematic that illustrates the application of a medical imaging technique in which a composite volumetric medical image of a part of the human skull of FIG. 3A is created from plurality of two-dimensional image slices.
Figure 3C:
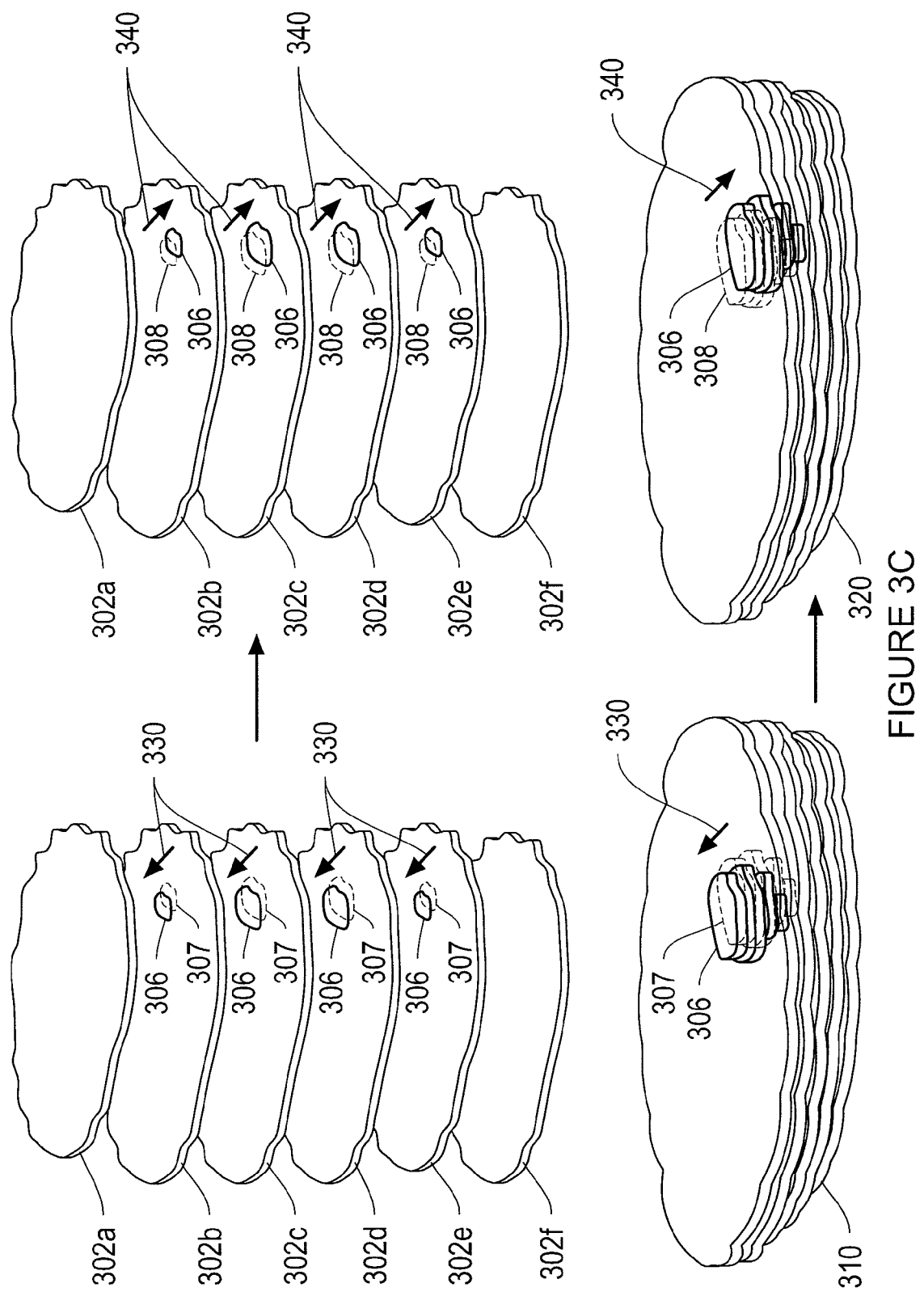
FIG. 3C illustrates the medical image from FIG. 3B in which a first graphical feature of the slices of the image move relative to the remainder of the image.
Figure 3D:
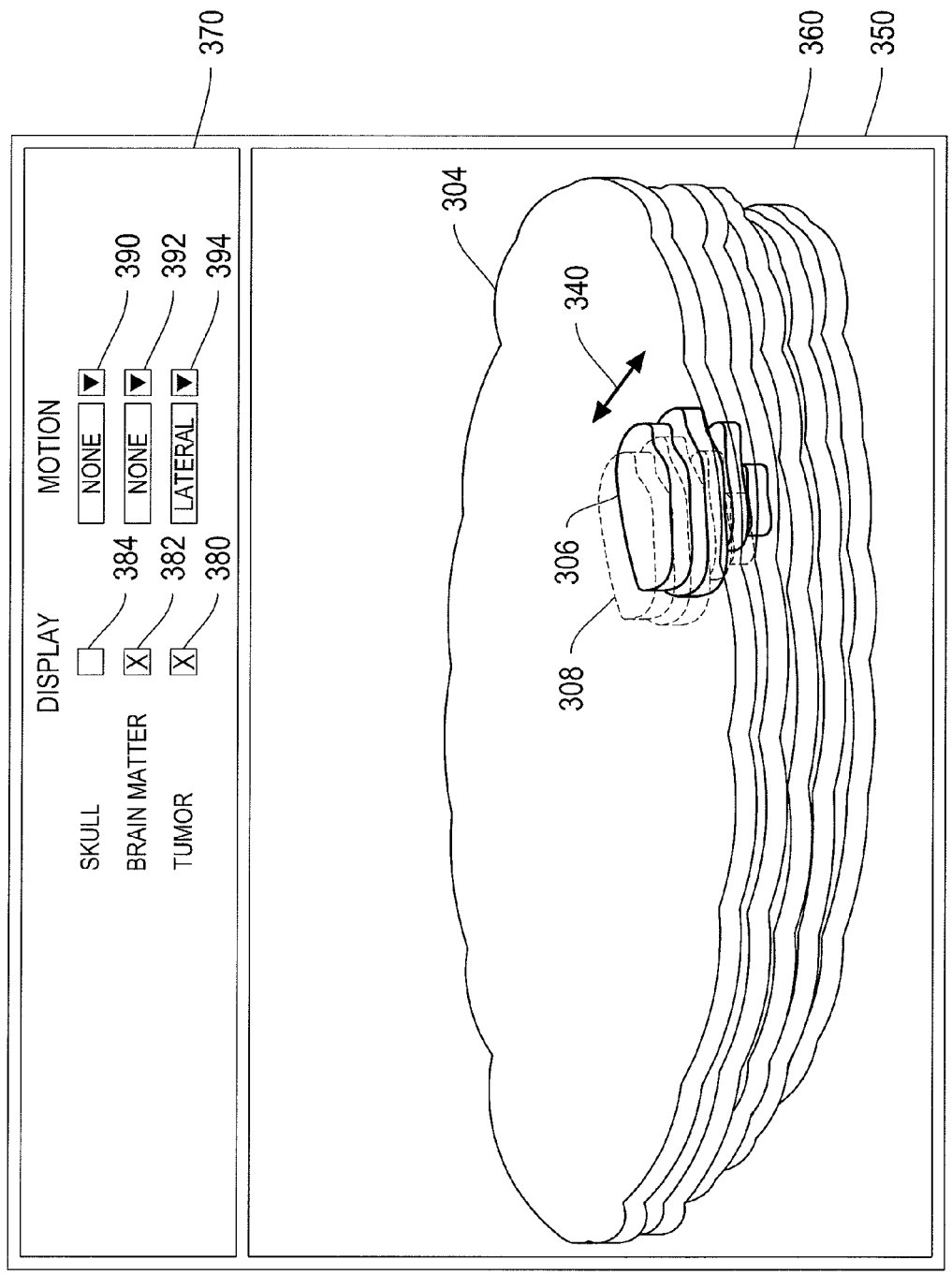
FIG. 3D is a diagram of a display containing the medical image from FIG. 3B in which some graphical features are displayed and/or moving.

FIGS. 3A-3E are a series of medical images displayed on display 108 of data visualization system 100 in FIG. 1, according to an illustrative embodiment of the invention. These series of images are illustrative of volumetric images that can be processed from 2-dimensional data and displayed by data visualization system 100 in FIG. 1. FIGS. 3A and 3B illustrate the application of a medical imaging technique in which 2-dimensional medical images or "slices" are received by data visualization system 100 of FIG. 1 and processed to create and display a composite volumetric medical image. FIGS. 3C and 3D show displays of graphical features of the image, and illustrate how data visualization system 100 of FIG. 1 can impart motion on graphical features of the image to highlight those graphical features. In addition, FIG. 3D shows a user interface employed by the data visualization system 100 in FIG. 1 for controlling the display and/or motion of image graphical features. Graphical features of displayed images depicted with dashed lines in FIGS. 3C and 3D correspond to initial positions of those graphical features relative to the displayed image to aid the reader in discerning imparted motion depicted in the figures. The data visualization system 100 of FIG. 1 need not display these lines.

FIG. 3A shows the application of a medical imaging technique in which 2-dimensional medical images or "slices" of a human skull 300 are captured and displayed by data visualization system 100 of FIG. 1. Human skull 300 contains, among other graphical features, a tumor 306 and brain matter 304. The slices could be capture by a medical imaging device that is part of data visualization system 100 of FIG. 1. For instance, the medical imaging device could be a CAT scan machine or an MRI machine, which produces CAT scan images, or MRI images, respectively. The medical imaging device of data visualization system 100 of FIG. 1 captures slices 302 of human skull 300. In FIG. 3A, six slices, 302*a*, 302*b*, 302*c*, 302*d*, 302*e*, and 302*f*, respectively, are captured and displayed. The number of slices captured may vary, i.e., in some instances as few as 1 or 2 slices may be captured, while in other instances, up to 100 slices may be captured. Each slice displayed by data visualization system 100 of FIG. 1 represents a particular cross-section of human skull 300, and contains information about tissue density across the cross section. For example, assuming that the tissue density of tumor 306 is substantially different than brain matter 304, slices 302*a* and 302*f* could represent portions of human skull 300 vertically above and below, respectively, tumor 306, and thus, do not contain any part of the tumor. In contrast, slices 302*b*, 302*c*, 302*d*, and 302*e*, each contain a particular portion of tumor 306. Data visualization system 100 of FIG. 1 displays each of the slices in 2-dimensions in FIG. 3A, but need not display the schematic of slices 302 within human skull 300.

FIG. 3B illustrates the application of a medical image processing technique in which a composite volumetric medical image of a part of the human skull of FIG. 3A is created and displayed on data visualization system 100 of FIG. 1. The data visualization system 100 of FIG. 1 assigns each of the two-dimensional image slices 302*a*, 302*b*, 302*c*, 302*d*, 302*e*, and 302*f*, respectively, of FIG. 3A a certain depth (or height), such that the slices now have 3 dimensions (left side of FIG. 3B). Each of these slices contains information about tissue density across the cross section and may contain a part of tumor 306 and/or brain matter 304. The data visualization system 100 of FIG. 1 then displays this stack of slices a composite volumetric image (right side of FIG. 3B). The human skull 300 is depicted merely for reference and need not be displayed by the data visualization system 100 of FIG. 1.

FIG. 3C shows a set of slices of the skull from FIG. 3B which illustrate how the data visualization system 100 of FIG. 1 can highlight a graphical feature within each slice of a volumetric image by imparting relative motion to that graphical feature relative to the slice. In this series of images, the data visualization system 100 of FIG. 1 displays the slices in two orientations, 310 and 320, respectively, and imparts motion on tumor 306 within each slice as illustrated by motion arrows 330 and 340. Specifically, data visualization system 100 of FIG. 1 imparts lateral motion on tumor 306 within each slice 302*a*, 302*b*, 302*c*, 302*d*, 302*e*, and 302*f*, respectively. In each of the orientations 310 and 320, the dashed lines 307 or 308 correspond to initial positions of tumor 306 relative to the rest of the slice.

The quick determination and display of a tumor in a volumetric image by data visualization system 100 of FIG. 1 in this manner is significantly advantageous. Although the user could, by careful attention, identify the bounds of tumor 306 in FIGS. 3A-3C, having data visualization system 100 of FIG. 1 automatically determine the bounds of the tumor and display the tumor in motion in 3 dimensions cause it to "jump out" at the human viewer. It is also beneficial to see tumor 306 displayed volumetrically in relation to the other anatomical portions in human skull 300. Furthermore, the data visualization system 100 of FIG. 1 can do so without obscuring originally presented information, for example, human skull 300 or brain matter 304.

FIG. 3D is a diagram of a user interface window 350 generated by the data visualization system 100 of FIG. 1 for controlling the display and/or motion of graphical features of volumetric images. The composite volumetric images, or the individual slices, of FIGS. 3A-3C could be displayed in user interface window 230. In FIG. 3D, user interface window 350 of data visualization system 100 of FIG. 1 is divided into two sub-windows: window 360 containing the composite volumetric image of human skull 300 from FIG. 3A, and window 370 containing a graphical user interface in which a human user, interacting with data visualization system 100 of FIG. 1 via user interface 110, may select various options for displaying and/or imparting motion on the graphical features of the image in window 360.

A human user interacting with data visualization system 100 of FIG. 1 can use graphical user interface window 370 to choose whether to display the human skull 300 (not displayed in FIG. 3D), brain matter 304, or tumor 306, by selecting or de-selecting the appropriate boxes 384, 382, or 380, respectively. Such a selection could be carried out using a mouse (114 in FIG. 1) or a keyboard query (112 in FIG. 1). Alternatively, a user could click directly on the image in window 360 to select graphical features for display. In FIG. 3D, display boxes 380 and 382 are selected or marked "x" such that data visualization system 100 of FIG. 1 displays brain matter 304 and tumor 306.

In addition, a human user interacting with data visualization system 100 of FIG. 1 can choose what kind of motion to impart to human skull 300, brain matter 304, or tumor 306 by selecting an option in the drop-down menus 390, 392, and 394 respectively. Examples of motion imparted by data visualization system 100 of FIG. 1 could be lateral motion, vertical motion, horizontal motion, circular motion, full- or partial-rotation motion, or no motion ("none"). Such a selection could be carried out using a mouse (114 in FIG. 1) or a keyboard query (112 in FIG. 1). Alternatively, a user could click or drag directly on the image in window 360 of data visualization system 100 of FIG. 1 to select graphical features visually representing portions of data on which the data visualization system will impart motion. In FIG. 3D, for example, the selection of options in drop-down menus 390, 392, and 394 is such that no motion is to be imparted on human skull 300 (not displayed in FIG. 3D) or brain matter 304, while lateral motion 340 is to be imparted on tumor 306. Thus, the data visualization system 100 of FIG. 1 imparts motion 340 on tumor 306 relative to brain matter 304. The initial position of tumor 306 is depicted with dashed lines 308.

In an alternative embodiment, data visualization system 100 of FIG. 1 could impart a first motion on the entire displayed composite volumetric image, while simultaneously imparting a second motion on a graphical feature of the volumetric image relative to the remainder of the volumetric image. With respect to FIGS. 3C-3D, an example would be one in which data visualization system 100 of FIG. 1 imparts a rotational motion on the entire composite image, and simultaneously imparts lateral motion on tumor 306. Although not shown in FIG. 3D, a human user interacting with the data visualization system 100 of FIG. 1 could select a motion to impart on the entire displayed volumetric image via interactions with user interface windows 360 or 370.

The data visualization system 100 of FIG. 1 could be used to identify a graphical feature visually representing a portion of a volumetric image by determining bounds of selected subject matter based on user input. Such a determination could be made by a human user using a mouse click, keyboard query, or a cursor brush to select an appropriate graphical feature, e.g., tumor 306, after which the data visualization system automatically determines the bound of the selected graphical feature based on the human user input. Alternatively, a user may interact with data visualization system 100 of FIG. 1 to enter a query (112 in FIG. 1), e.g., enter a range of tissue density corresponding to tumor tissue density, and this query would result in the data visualization system 100 in FIG. 1 identifying and displaying graphical features of the volumetric image with this range of tissue density. Alternatively, data visualization system 100 of FIG. 1 identifies a graphical feature representing a portion of a volumetric image using a computer-executable pattern recognition or signal processing algorithm. Such an identification may not involve user input.

In the illustrations of FIGS. 3C and 3D, the relative motions imparted by data visualization system 100 of FIG. 1 may also be vibrations—harmonic or random. For example in FIGS. 3C and 3D, tumor 306 could, for example, have vertical or lateral vibrational motion relative to the remainder of the image. And, the motion is not necessarily a change in position from some rest position; it can, for instance be a small change in shape, such as a rhythmic contraction or expansion of tumor 306 in FIGS. 3C and 3D.

Figure 4B:
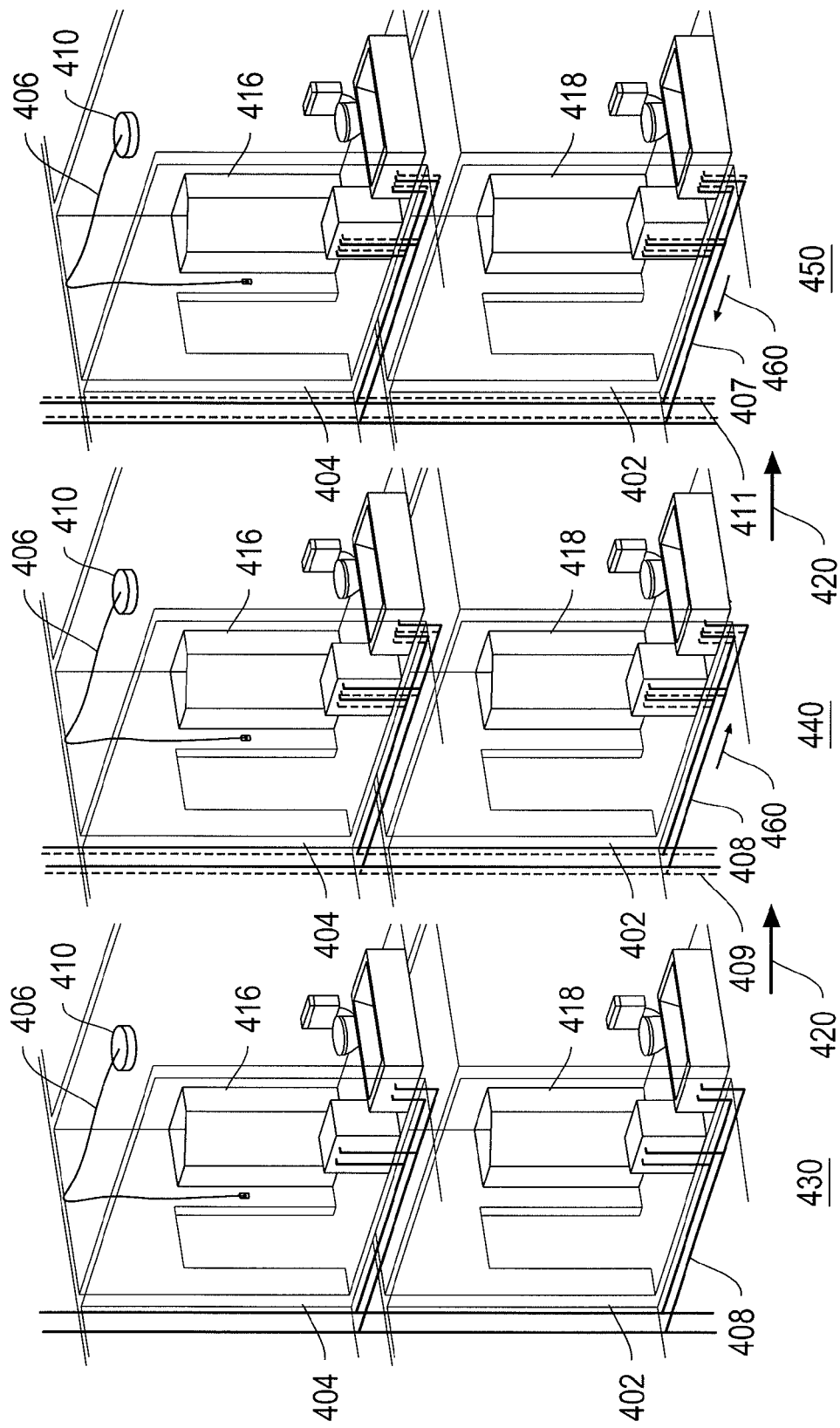
FIG. 4B illustrates the volumetric architectural drawing from FIG. 4A in which one graphical feature of the drawing moves relative to the remainder of the drawing when viewed from one perspective.
Figure 4C:
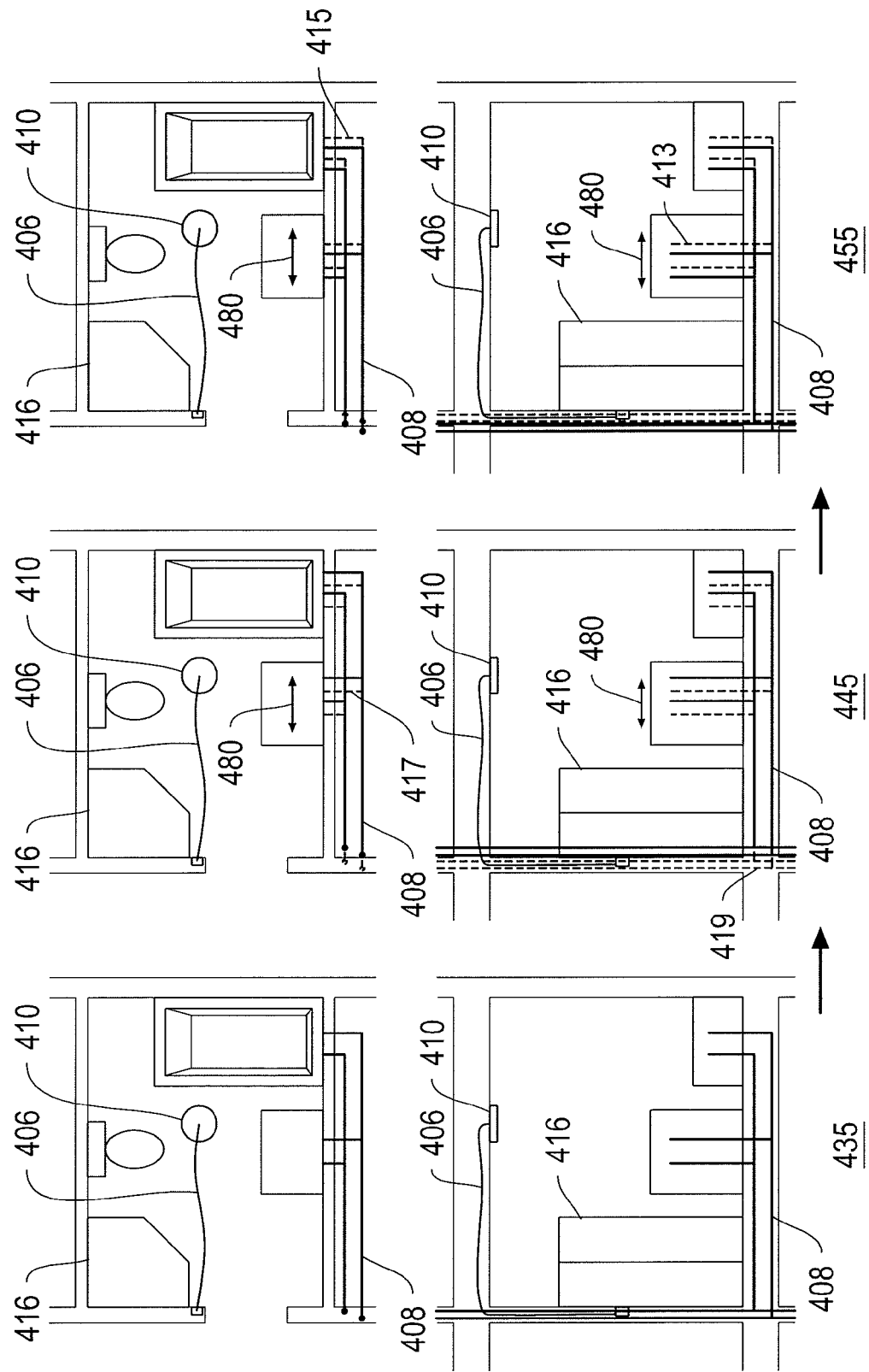
FIG. 4C illustrates the volumetric architectural drawing from FIG. 4A in which one graphical feature of the drawing moves relative to the remainder of the drawing when viewed from a different perspective.
Figure 4D:
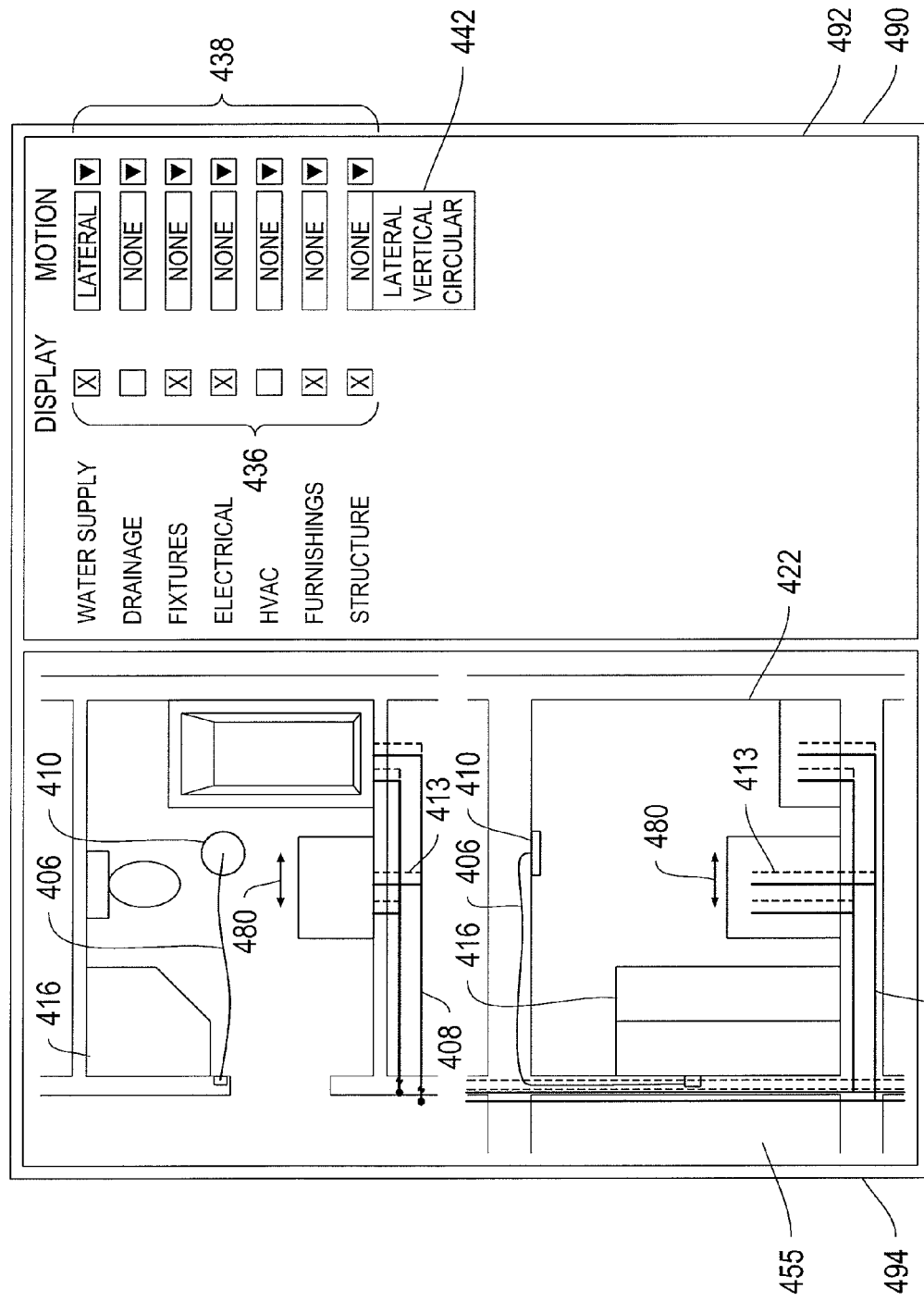
FIG. 4D is a diagram of a display containing a volumetric architectural drawing from FIG. 4A in which some graphical features are displayed and/or moving.

FIGS. 4A-4D are a set of architectural drawings displayed on display 108 of data visualization system 100 in FIG. 1, according to an illustrative embodiment of the invention. These series of images are illustrative of data that can be processed and displayed by data visualization system 100 in FIG. 1. FIG. 4A is a set of architectural drawings in which multiple graphical features of a building, for example, the water supply and electrical system, are displayed. FIGS. 4B and 4C show displays of the architectural drawings that illustrate how data visualization system 100 of FIG. 1 can impart motion on graphical features visually representing portions of the drawings to highlight those graphical features. FIG. 4D shows a user interface employed by the data visualization system 100 in FIG. 1 for controlling the display and/or motion of image portions. Graphical features of displayed images depicted with dashed lines in FIGS. 4B-4D correspond to initial positions of those graphical features relative to the displayed image to aid the reader in discerning imparted motion depicted in the figures. The data visualization system 100 of FIG. 1 need not display these lines.

FIG. 4A shows a set of architectural drawings, examples of volumetric images displayed by data visualization system 100 of FIG. 1. Graphical data from which the volumetric images were formed may have been captured by a device for generating architectural drawings that is part of data visualization system 100 of FIG. 1. Data visualization system 100 of FIG. 1 displays multiple graphical features of the architectural drawings, for example, the water supply 408, electrical system 406, furnishings 416, and fixtures 410. In particular, architectural drawing 400, on the left of FIG. 4A, illustrates two floors, 402 and 404, of a building, while architectural drawings 412 and 414, on the right of FIG. 4A, show a floor 404 of drawing 400 from a top-view and a side-view, respectively.

FIG. 4B shows a time series of images of architectural drawing 400 from FIG. 4A which illustrates how the data visualization system 100 of FIG. 1 can highlight a graphical feature visually representing a portion of a volumetric image by imparting relative motion to that graphical feature. In this series of images, the data visualization system displays drawing 400 in various states, 430, 440, and 450, respectively. In states 440, and 450, data visualization system 100 of FIG. 1 imparts motion 460 on water supply 408. In each of states 440 and 450, the dashed lines 409 and 411 correspond to initial positions of water supply 408 relative to the rest of the architectural drawing.

FIG. 4C shows a time series of images of architectural drawings 412 and 414 from FIG. 4A which illustrates how the data visualization system 100 of FIG. 1 can highlight a graphical feature visually representing a portion of a volumetric image by imparting relative motion to that graphical feature. In this series of images, the data visualization system displays drawings 412 and 414 in various states, 435, 445, and 455, respectively. In states 445, and 455, data visualization system 100 of FIG. 1 imparts lateral motion 480 on water supply 408. In each of states 445 and 455, the dashed lines 419, 413, 415, and 417, correspond to initial positions of water supply 408 relative to the rest of the architectural drawing. Note that FIG. 4C is an illustration of the same motion imparted by data visualization system 100 of FIG. 1 as in FIG. 4B, but viewed from a different user point-of-view or perspective.

The quick determination and display of a particular graphical feature in an architectural drawing in this manner is advantageous. Although the user could, by careful attention, identify the water supply 408 in FIG. 4B or 4C, having data visualization system 100 of FIG. 1 automatically determine and display water supply 408 in motion cause it to "jump out" at the human viewer. Furthermore, the system can do so without obscuring originally presented information, for example, electrical system 406 or fixtures 410.

FIG. 4D is a diagram of a user interface window 490 generated by the data visualization system 100 of FIG. 1 for controlling the display and/or motion of graphical features of volumetric images. The architectural drawings of FIGS. 4A-4C could be displayed in user interface window 490. In FIG. 4D, user interface window 490 of data visualization system 100 of FIG. 1 is divided into two sub-windows: window 494 containing the architectural drawing in state 455 of FIG. 3C, and window 492 containing a graphical user interface in which a human user, interacting with data visualization system 100 of FIG. 1 via user interface 110, may select various options for displaying and/or imparting motion on the graphical features of the image in window 494.

With respect to FIG. 4D, a human user interacting with data visualization system 100 of FIG. 1 can use graphical user interface window 492 to choose whether to display, among others, water supply 408, electrical system 406, fixtures 410, furnishings 416, or any combination thereof, by selecting or de-selecting the appropriate boxes 436. Such a selection could be carried out using a mouse (114 in FIG. 1) or a keyboard query (112 in FIG. 1). Alternatively, a user could click directly on the image in window 494 to select graphical features for display. In FIG. 4D, display boxes 436 are selected or marked "x" such that data visualization system 100 of FIG. 1 displays water supply 408, fixtures 410, electrical system 406, furnishings 416, and structure 422 of drawing 455 in window 494. The display of a selected graphical feature may be accomplished by, for example, the data visualization system 100 of FIG. 1 determining and displaying all the parts of the architectural drawing image which are similar in appearance to the user-selected graphical feature(s) e.g. water supply 408. In some embodiments, data visualization system 100 of FIG. 1 identifies graphical features in the architectural drawings in FIGS. 4A-4D using a computer-executable pattern recognition or signal processing algorithm. Such an identification may not involve user input.

In addition, a human user interacting with data visualization system 100 of FIG. 1 can choose what kind of motion to impart to water supply 408, fixtures 410, electrical system 406, furnishings 416, and structure 422, by selecting an option in the drop-down menus 438 respectively. Examples of motion imparted by data visualization system 100 of FIG. 1 could be lateral motion, vertical motion, or circular motion as shown in expanded drop-down menu 442. Such a selection could be carried out using a mouse (114 in FIG. 1) or a keyboard query (112 in FIG. 1). Alternatively, a user could click or drag directly on the image in window 494 of data visualization system 100 of FIG. 1 to select graphical features on which the data visualization system will impart motion. In FIG. 4D, for example, the selection of options in drop-down menus 438 is such that lateral motion 480 is to be imparted on water supply 408 and no motion is to be imparted on electrical system 406. Thus, the data visualization system 100 of FIG. 1 imparts motion 480 on water supply 408 relative to architectural drawing 455. The initial position of water supply 408 is depicted with dashed lines 413.

In a further embodiment, data visualization system 100 of FIG. 1 could impart a first motion on the entire volumetric image, while simultaneously imparting a second motion on a graphical feature of the volumetric image relative to the remainder of the volumetric image. With respect to FIGS. 4B-4D, an example would be one in which data visualization system 100 of FIG. 1 imparts a rotation motion on the entire volumetric image, and simultaneously imparts lateral motion on water supply 408. Although not shown in FIG. 4D, a human user interacting with the data visualization system 100 of FIG. 1 could select a motion to impart on the entire displayed volumetric image via user interface windows 492 or 494.

In the illustrations of FIGS. 4B-4D, the relative motions imparted by data visualization system 100 of FIG. 1 may also be vibrations—harmonic or random. For example, water supply 408 could, for example, have vertical or lateral vibrational motion relative to the remainder of the architectural drawing. And, the motion is not necessarily a change in position from some rest position; it can, for instance be a small change in shape, such as a rhythmic contraction or expansion of water supply 408 in FIGS. 4B-4D.

The invention may be embodied in other specific forms without departing from the spirit or essential characteristics thereof. The forgoing embodiments are therefore to be considered in all respects illustrative, rather than limiting of the invention. For example, the data visualization system may be used to display security screening images in which particular graphical features of the image are displayed with motion imparted on them. The data processed by the data visualization system may include a mechanical engineering drawing, e.g., of a bridge design, an automotive design and test evaluation drawing, a geological model, e.g., a model of the earth in which identified natural resource deposits move relative to other underground features, such as ground water, soil strata, etc. Furthermore, the data visualization system may be used to display data that may not naturally lend themselves to 3-dimensional displays e.g. epidemiological data in which certain demographic data, e.g., age, income, and weight are mapped to x-y-z dimensions of a volumetric image and others data, such as height, blood pressure, or lung capacity, being mapped to color, brightness, or other visual parameter. In general, the data visualization system may be used in any domain in which one could use a volumetric image for displaying and analyzing data, and in which one is interested in locating logical collections within the data set image relative to the whole data set.

What is claimed is:

1. A non-transitory computer readable medium storing computer executable instructions, which, when executed by a processor, cause the processor to carry out a method for displaying graphical data, comprising:
  receiving graphical data corresponding to a volumetric image of at least one physical object, wherein the graphical data comprises a plurality of 2-dimensional slices;
  displaying the volumetric image incorporating a plurality of graphical features visually representing portions of the at least one physical object; and
  imparting a first motion to a first of the graphical features relative to a remainder of the volumetric image to highlight the first graphical feature, wherein the first graphical feature is included in two or more of the 2-dimensional slices, and wherein imparting the first motion comprises imparting motion to only portions of the two or more 2-dimensional slices that contain the first graphical feature.

2. The non-transitory computer readable medium of claim 1, wherein the graphical data corresponds to medical image data.

3. The non-transitory computer readable medium of claim 2, wherein the volumetric image is obtained from a plurality of image sources.

4. The non-transitory computer readable medium of claim 2, wherein the medical image data is captured using different imaging techniques.

5. The non-transitory computer readable medium of claim 1, wherein the graphical data corresponds to security screening data.

6. The non-transitory computer readable medium of claim 1, wherein the graphical data corresponds to architectural drawing data.

7. The non-transitory computer readable medium of claim 1, comprising computer executable instructions for causing the processor to obtain three-dimensional graphical data by analyzing a set of graphical data having at least two dimensions.

8. The non-transitory computer readable medium of claim 1, wherein at least one part of the graphical data is received from a different source than used for a remainder of the graphical data.

9. The non-transitory computer readable medium of claim 1, comprising computer executable instructions for causing the processor to impart a second motion to a second graphical feature of the volumetric image that is different than the first motion to visually distinguish the two graphical features from one another.

10. The non-transitory computer readable medium of claim 1, comprising computer executable instructions for causing the processor to impart a second motion to the entire volumetric image that is different than the first motion to visually distinguish the first graphical feature of the volumetric image from a remainder of the volumetric image when viewed from multiple perspectives.

11. The non-transitory computer readable medium of claim 1, comprising computer executable instructions for causing the processor to impart a localized motion to a first part of the first graphical feature of the volumetric image to visually distinguish the first part of the first graphical feature of the volumetric image from a remainder of the volumetric image.

12. The non-transitory computer readable medium of claim 1, wherein the processor receives an input from a user.

13. The non-transitory computer readable medium of claim 12, wherein the user input comprises a query.

14. The non-transitory computer readable medium of claim 12, wherein the user input comprises one of a mouse click and a cursor brush.

15. The non-transitory computer readable medium of claim 12, comprising computer executable instructions for causing the processor to identify the first graphical feature by determining bounds of selected subject matter based on the user input.

16. The non-transitory computer readable medium of claim 1, wherein the first graphical feature is volumetrically displayed and represents a portion of the volumetric image.

17. The method of claim 1, wherein imparting motion to only portions of the two or more 2-dimensional slices that contain the first graphical feature comprises imparting motion to a respective portion of each of the two or more 2-dimensional slices that contain the first graphical feature in relation to a remainder of a respective 2-dimensional slice.

18. A method for analyzing data having at least three dimensions comprising:
 receiving, by a processor, graphical data corresponding to a volumetric image of at least one physical object for display, wherein the graphical data comprises a plurality of 2-dimensional slices;
 displaying, by the processor, the volumetric image incorporating a plurality of graphical features visually representing portions of the at least one physical object;
 imparting, by the processor, a first motion to a first of the graphical features relative to a remainder of the volumetric image to highlight the first graphical feature, wherein the first graphical feature is included in two or more of the 2-dimensional slices, and wherein imparting the first motion comprises imparting motion to only portions of the two or more 2-dimensional slices that contain the first graphical feature.

19. The method of claim 18, wherein the graphical data corresponds to medical image data.

20. The method of claim 19, wherein the medical image data is captured using different imaging techniques.

21. The method of claim 18, wherein the graphical data corresponds to security screening data.

22. The method of claim 18, wherein the graphical data corresponds to architectural drawing data.

23. The method of claim 18, further comprising obtaining, by the processor, three-dimensional graphical data by analyzing a set of graphical data having at least two dimensions.

24. The method of claim 18, wherein at least one part of the volumetric image is obtained from a different source than used for a remainder of the volumetric image.

25. The method of claim 18, further comprising imparting, by the processor, a second motion on a second graphical feature of the volumetric image that is different than the first motion to visually distinguish the two graphical features from one another.

26. The method of claim 18, further comprising imparting, by the processor, a second motion on the entire volumetric image that is different than the first motion to visually distinguish the first graphical feature of the volumetric image from a remainder of the volumetric image when viewed from multiple perspectives.

27. The method of claim 18, further comprising imparting, by the processor, a localized motion to a first part of the first graphical feature of the volumetric image to visually distinguish the first part of the first graphical feature of the volumetric image from a remainder of the volumetric image.

28. The method of claim 18, further comprising receiving, by the processor, an input from a user.

29. The method of claim 28, wherein the user input comprises a query.

30. The method of claim 28, wherein the user input comprises one of a mouse click and a cursor brush.

31. The method of claim 28, further comprising identifying, by the processor, the first graphical feature by determining bounds of selected subject matter based on the user input.

32. The method of claim 18, wherein the first graphical feature is volumetrically displayed.

33. The method of claim 18, wherein imparting motion to only portions of the two or more 2-dimensional slices that contain the first graphical feature comprises imparting motion to a respective portion of each of the two or more 2-dimensional slices that contain the first graphical feature in relation to a remainder of a respective 2-dimensional slice.

34. A system for displaying a volumetric image comprising:
 a user interface;
 a display;
 a memory for storing graphical data;
 a processor configured for:
  receiving graphical data corresponding to a volumetric image of at least one physical object, wherein the graphical data comprises a plurality of 2-dimensional slices;
  displaying the volumetric image incorporating a plurality of graphical features visually representing portions of at least one physical object;
  processing input from the user interface to identify a first of the displayed graphical features; and
  imparting a first motion to the first identified graphical feature relative to a remainder of the volumetric image to highlight the first graphical feature, wherein the first graphical feature is included in two or more of the 2-dimensional slices, and wherein imparting the first motion comprises imparting motion to only portions of the two or more 2-dimensional slices that contain the first graphical feature.

35. The system of claim 34, further comprising a medical imaging device.

36. The system of claim 35, wherein medical image data is obtained from a plurality of medical imaging devices.

37. The system of claim 34, further comprising a security screening device.

38. The system of claim 34, further comprising a device for generating architectural drawings.

39. The system of claim 34, wherein the processor is configured for obtaining three-dimensional graphical data by analyzing a set of graphical data having at least two dimensions.

40. The system of claim 34, wherein at least one part of the graphical data is received from a different source than used for a remainder of the graphical data.

41. The system of claim 34, wherein the processor is configured for imparting a second motion on a second graphical feature of the volumetric image that is different than the first motion to visually distinguish the two graphical features from one another.

42. The system of claim 34, wherein the processor is configured for imparting a second motion on the entire volumetric image that is different than the first motion to visually distinguish the first graphical feature of the volumetric image from a remainder of the volumetric image when viewed from multiple perspectives.

43. The system of claim 34, wherein the processor is configured for imparting a localized motion to a first part of the first graphical feature of the volumetric image to visually distinguish the first part of the first graphical feature of the volumetric image from a remainder of the volumetric image.

44. The system of claim 34, wherein the user interface receives an input from a user.

45. The system of claim 44, wherein the user input comprises a query.

46. The system of claim 44, wherein the user input comprises one of a mouse click and a cursor brush.

47. The system of claim 44, wherein the processor is configured for identifying the first graphical feature by determining bounds of selected subject matter based on the user input.

48. The system of claim 34, wherein the first graphical feature is volumetrically displayed.

49. The system of claim 34, wherein imparting motion to only portions of the two or more 2-dimensional slices that contain the first graphical feature comprises imparting motion to a respective portion of each of the two or more 2-dimensional slices that contain the first graphical feature in relation to a remainder of a respective 2-dimensional slice.

* * * * *